(12) United States Patent
Ewald et al.

(10) Patent No.: US 11,345,246 B2
(45) Date of Patent: May 31, 2022

(54) MOTOR VEHICLE WITH AN ELECTRIC CONTACTING UNIT

(71) Applicant: Bayerische Motoren Werke Aktiengesellschaft, Munich (DE)

(72) Inventors: Alexander Ewald, Garching (DE); Stefan Goldammer, Pfaffenhofen an der Ilm (DE); Bernhard Hoess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/046,615

(22) PCT Filed: Feb. 15, 2019

(86) PCT No.: PCT/EP2019/053819
§ 371 (c)(1),
(2) Date: Oct. 9, 2020

(87) PCT Pub. No.: WO2019/197070
PCT Pub. Date: Oct. 17, 2019

(65) Prior Publication Data
US 2021/0101493 A1 Apr. 8, 2021

(30) Foreign Application Priority Data
Apr. 12, 2018 (DE) ...................... 10 2018 205 594.7

(51) Int. Cl.
*B60L 53/16* (2019.01)
*H01R 13/52* (2006.01)
*B60L 53/30* (2019.01)

(52) U.S. Cl.
CPC .......... *B60L 53/16* (2019.02); *H01R 13/5202* (2013.01); *H01R 13/5213* (2013.01); *B60L 53/30* (2019.02); *H01R 2201/26* (2013.01)

(58) Field of Classification Search
CPC ............ H01R 13/5202; H01R 13/5213; H01R 2201/26; B60L 53/16
See application file for complete search history.

(56) References Cited

U.S. PATENT DOCUMENTS 5,850,135 A 12/1998 Kuki et al.
2011/0306223 A1* 12/2011 Bauer ................ H01R 13/6397
439/136

(Continued)

FOREIGN PATENT DOCUMENTS

CN       108270115 A  *  7/2018  ......... H01R 13/5213
DE       697 14 879 T2     5/2003

(Continued)

OTHER PUBLICATIONS

International Search Report (PCT/ISA/210) issued in PCT Application No. PCT/EP2019/053819 dated May 23, 2019 with English translation (five (5) pages).

(Continued)

*Primary Examiner* — Tho D Ta
(74) *Attorney, Agent, or Firm* — Crowell & Moring LLP

(57) ABSTRACT

Charging robots can automatically move and connect a plug to a vehicle-side socket connector such that a battery of the vehicle can be conductively charged. A motor vehicle is provided with an electric contacting unit with electric contacts which are protected against soiling and spray water. The electric contacting unit is rigidly connected to the motor vehicle for electrically contacting an external charging cable. The contacting unit includes at least electric contacts and a movable cover that can be moved between a protective position, in which the cover covers the electric contacts and protects same against soiling and/or water, and a charging position, in which the electric contacts can be accessed from the vehicle surroundings.

12 Claims, 4 Drawing Sheets

(56) References Cited

U.S. PATENT DOCUMENTS

| | | | |
|---|---|---|---|
| 2016/0121744 A1 | 5/2016 | Meinl et al. | |
| 2017/0244200 A1* | 8/2017 | Lopes | H01R 13/5219 |
| 2018/0043848 A1* | 2/2018 | Kawai | H01R 13/506 |
| 2019/0009680 A1* | 1/2019 | Kauffmann | H01R 13/5202 |
| 2020/0164758 A1 | 5/2020 | Flechl | |

FOREIGN PATENT DOCUMENTS

| | | | | |
|---|---|---|---|---|
| DE | 10 2009 001 080 A1 | | 8/2010 | |
| DE | 10 2010 028 126 A1 | | 10/2011 | |
| DE | 102012103550 A1 | * | 10/2013 | H01R 13/5213 |
| DE | 10 2013 021 849 A1 | | 8/2014 | |
| DE | 10 2014 115 907 A1 | | 5/2016 | |
| DE | 102014115907 A1 | * | 5/2016 | B60L 53/16 |
| EP | 2603954 A1 | * | 6/2013 | H01R 13/5213 |
| FR | 2 972 081 A1 | | 8/2012 | |
| GB | 2238183 A | * | 5/1991 | H02G 3/088 |
| GB | 2515045 A | * | 12/2014 | H01R 13/4534 |
| KR | 20160129508 A | * | 11/2016 | H01R 13/5213 |
| WO | WO-2015055389 A1 | * | 4/2015 | B60L 53/16 |
| WO | WO-2017055410 A1 | * | 4/2017 | B60L 53/16 |
| WO | WO 2019/060939 A1 | | 4/2019 | |

OTHER PUBLICATIONS

German-language Written Opinion (PCT/ISA/237) issued in PCT Application No. PCT/EP2019/053819 dated May 23, 2019 (five (5) pages).

* cited by examiner

MOTOR VEHICLE WITH AN ELECTRIC CONTACTING UNIT

BACKGROUND AND SUMMARY OF THE INVENTION

The invention relates to a motor vehicle having an electrical contacting unit fixed to the vehicle for electrical contacting of an external charging cable.

Electric and plug-in hybrid vehicles offer the possibility of charging a battery of the vehicle at a conventional household plug socket, or at a charging pillar, with a charging cable. Said charging cable commonly comprises a plug connector, which has an interface to the household plug socket or to the charging pillar.

Such charging cables are commonly supplied with the corresponding vehicle by vehicle manufacturers and are accommodated for example in the luggage compartment. If a user wishes to charge the battery of the vehicle, they must remove the corresponding charging cable from the luggage compartment and connect this to the household plug socket or to the charging pillar and also open a corresponding flap on the vehicle in order to connect the charging cable to the corresponding charging socket of the vehicle. After the charging process, they must in turn remove the charging cable from the household plug socket or from the charging pillar and likewise remove the charging cable from the charging socket on the vehicle, and stow the charging cable in the luggage compartment again.

Disadvantages here are the relatively cumbersome handling of the charging cable and the associated time requirement. In particular in the case of a loaded luggage compartment, the removal of the charging cable is made additionally more difficult. Furthermore, the luggage compartment volume is reduced as a result of the accommodation of a charging cable.

To eliminate these disadvantages, it is known to use so-called charging robots or automated contacting systems which can automatically connect an electric or plug-in hybrid vehicle to the electrical grid for the purposes of charging the battery without the vehicle user having to manually themselves connect a charging cable.

For example, DE 697 14 879 T2 discloses an inductive charging system in the case of which a primary coil is moved into the immediate vicinity of a secondary coil on the motor vehicle, such that the battery of the motor vehicle can be inductively charged.

The company Volterio discloses, on its Internet homepage, a charging robot which can move a conical plug connector to a plug socket on the vehicle in automated fashion and connect said plug connector to said plug socket, such that the battery of the vehicle can be conductively charged.

With the aid of such charging robots or automated contacting systems, a battery of an electric or plug-in hybrid vehicle can be charged without a vehicle user having to manually connect the vehicle to a charging pillar or charging plug socket. Here, the contacting of the vehicle is commonly performed on the vehicle underside, from below in a vehicle vertical direction. However, the vehicle underside in particular is particularly greatly exposed to spray water and dirt.

It is an object of the invention to provide a motor vehicle having an electrical contacting unit with electrical contacts which are protected against contaminants and spray water.

According to the invention, a motor vehicle has an electrical contacting unit which is fixedly connected to the motor vehicle and which serves for the electrical contacting of an external charging cable. The contacting unit comprises at least electrical contacts and a movable cover which is movable between a protective position, in which it covers the electrical contacts and thus protects them against dirt and/or water, and a charging position, in which the electrical contacts are accessible from the vehicle surroundings.

The electrical contacting unit is attached to the vehicle outer side and is thus fully exposed to all environmental influences. These include, for example, rain, snow, dust and other contaminants, but also mechanical loads for example as a result of stone impacts or also bollards in the case of the electrical contacting unit being attached to the vehicle underside. In the protective position, the cover serves for protecting the actual electrical contacts against these environmental influences. Here, the cover prevents rain, snow, dust or other contaminants from reaching the electrical contacts. It is only for the charging of the battery that the protective cover is moved from the protective position into the charging position, in which the electrical contacts are accessible such that a charging cable can be connected to the electrical contacts.

Preferably, the cover is an elongate hollow body and, in the protective position, surrounds the electrical contacts in an encircling manner, whereas, in the charging position, the cover is situated adjacent to the electrical contacts. In the protective position, the electrical contacts are thus situated in the cavity of the cover. By contrast, in the charging position, the cover is situated adjacent to the electrical contacts, such that these are freely accessible and the connection of a charging cable is possible without problems.

The elongate hollow body of the cover expediently has a rectangular or trapezoidal cross section. The cover is thus composed at least of two mutually parallel walls which are connected to one another at both sides by two further walls, such that a hollow body is formed. Such a hollow body makes it possible to realize a particularly flat construction of the cover.

In one advantageous refinement, the cover is movable in translational fashion between the charging position and the protective position. Here, the mobility is ideally in the direction of the longitudinal extent of the cover. The translational movement of the cover may be performed manually. The movement however preferably occurs in a manner driven by external power, that is to say for example by means of an electric motor. In this way, to charge the battery, the user does not need to access the electrical contacting unit and move the cover from the protective position into the charging position by hand, but rather the movement may occur automatically for example at the touch of a button or on the basis of a control signal for example from a charging robot, such that the user does not have to access the electrical contacting unit, and ideally does not have to perform any actions whatsoever in order to cause the battery to be charged.

Ideally, the cover has a closed end side, such that the cover has only one open end side. During the movement of the cover from the charging position into the protective position, the cover moves with the open end side over the electrical contacts until these are situated entirely in the cavity of the cover.

The electrical contacting unit fixed to the vehicle preferably has a main support which is connected to the motor vehicle and to which the electrical contacts are attached. The main support may, for this purpose, have for example a mounting portion for the fastening to the vehicle.

If the electrical contacting unit is attached to the vehicle underside, it can be exposed to extremely high loads in the event of driving through water. In order that the electrical contacts are protected against moisture even in such a situation, a seal may be provided between the cover and the main support, which seal is arranged such that, in the protective position, the cover is sealed off with respect to the main support in encircling fashion. For this purpose, the seal may be attached either to the main support or to the cover. Ideally, the seal is attached, in encircling fashion around the open end side, to the cover.

Additionally, the main support may have a wall against which the cover bears in encircling fashion by way of the open side in the protective position. This wall may for example protrude from the mounting portion of the main support. The electrical contacts may then be attached for example in the central region of this wall. Then, in the protective position of the cover, the electrical contacts are situated in the cavity of the cover, which cavity is closed on all sides. One end side of the cover is closed in any case, and the other, open end side bears against the wall, such that it is likewise closed. In this way, the electrical contacts are already very well protected against all possible damaging environmental influences. The seal may then additionally seal off the cover, for example with respect to said wall, in the protective position. Alternatively, the main support may however also have differently designed portions, against which the seal can bear sealingly in the protective position of the cover.

A further load is imparted by spray water, which, normally mixed with dirt, reaches virtually all points on the outside of a motor vehicle during travel. It must therefore be assumed that such spray water also reaches the electrical contacting unit. In the protective position, the electrical contacts are well protected. There is however a certain risk that, during the movement of the cover into the charging position, spray water situated on or at the cover runs down off the cover during a movement thereof. In order to now prevent this dripping spray water from inadvertently being able to reach the electrical contacts during the movement of the cover, the cover may advantageously have at least one protruding web which conducts away the spray water situated on and/or at the cover and keeps said spray water away from the electrical contacts in targeted fashion.

The drawing illustrates an exemplary embodiment of the invention, on the basis of which the invention will be described in more detail below.

DETAILED DESCRIPTION OF THE DRAWINGS

Figure 1:
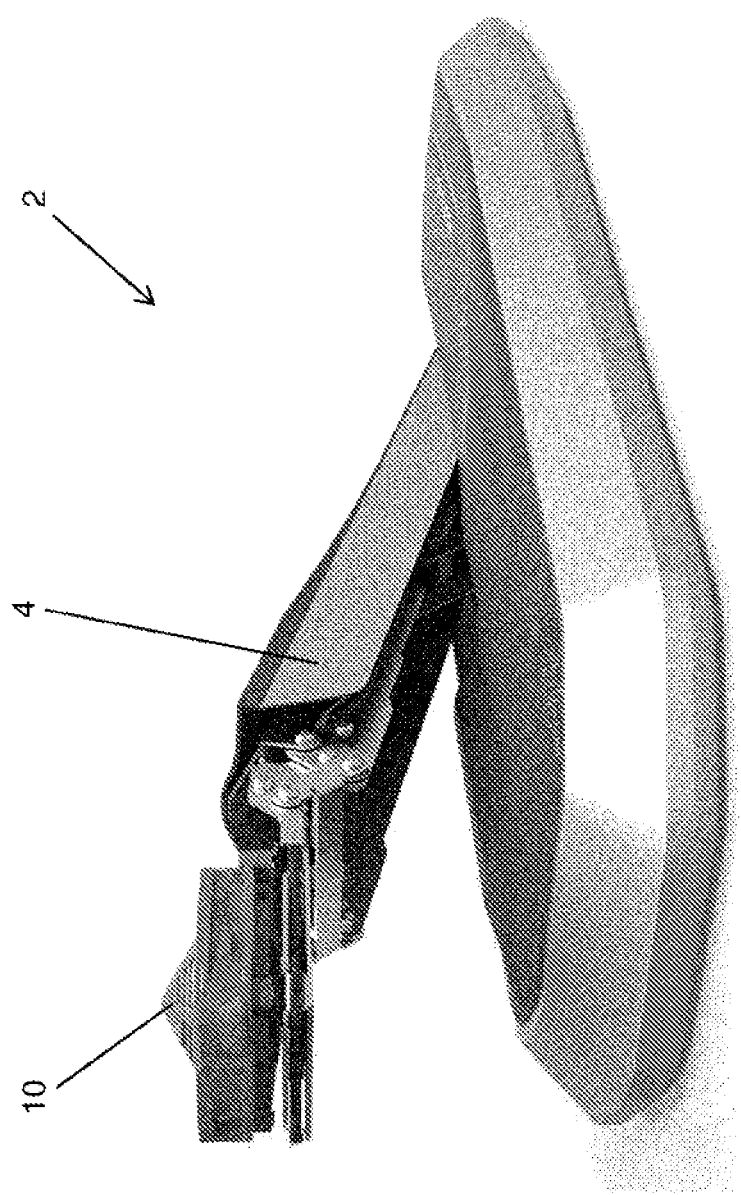
FIG. 1 is a schematic illustration of a charging robot such as is already known.

FIG. 1 shows a charging robot 2 from the company Volterio. The charging robot 2 is intended in particular for use on private land for the purposes of charging a battery of an electric or plug-in hybrid vehicle. It is intended for use on an at least predominantly planar floor, and is distinguished by a very flat construction, such that the electric or plug-in hybrid vehicle to be charged can drive at least partially over the charging robot 2 between the wheels. The motor vehicle has an electrical contacting unit on its underside. The counterpart that fits with this contacting unit is situated on a movable arm 4 of the charging robot 2. As soon as the vehicle is within the range of the charging robot 2, the latter can automatically move into the correct position and pivot the arm 4 upward, such that the electrical contact between the charging cable connected to the charging robot 2 and the electrical contacting unit on the underside of the motor vehicle is produced, and thus the battery of the motor vehicle can be charged. For the contacting and for the starting of the charging process, there is no longer a need for any action on the part of the vehicle user, but rather the entire contacting of the charging cable occurs fully automatically by means of the charging robot 2.

Figure 2:
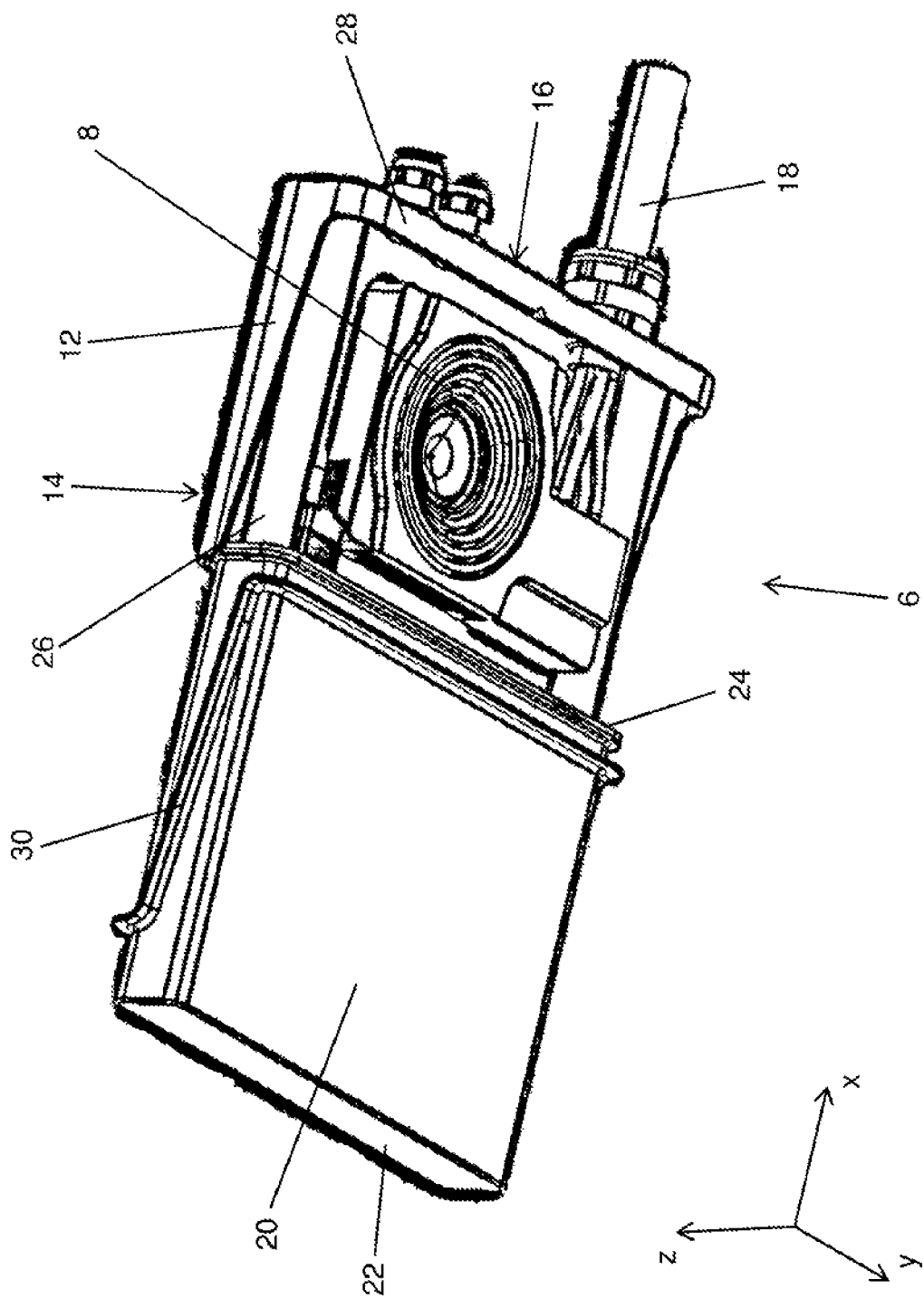
FIG. 2 is a schematic perspective view of a contacting unit on a vehicle for the charging robot.
Figure 3:
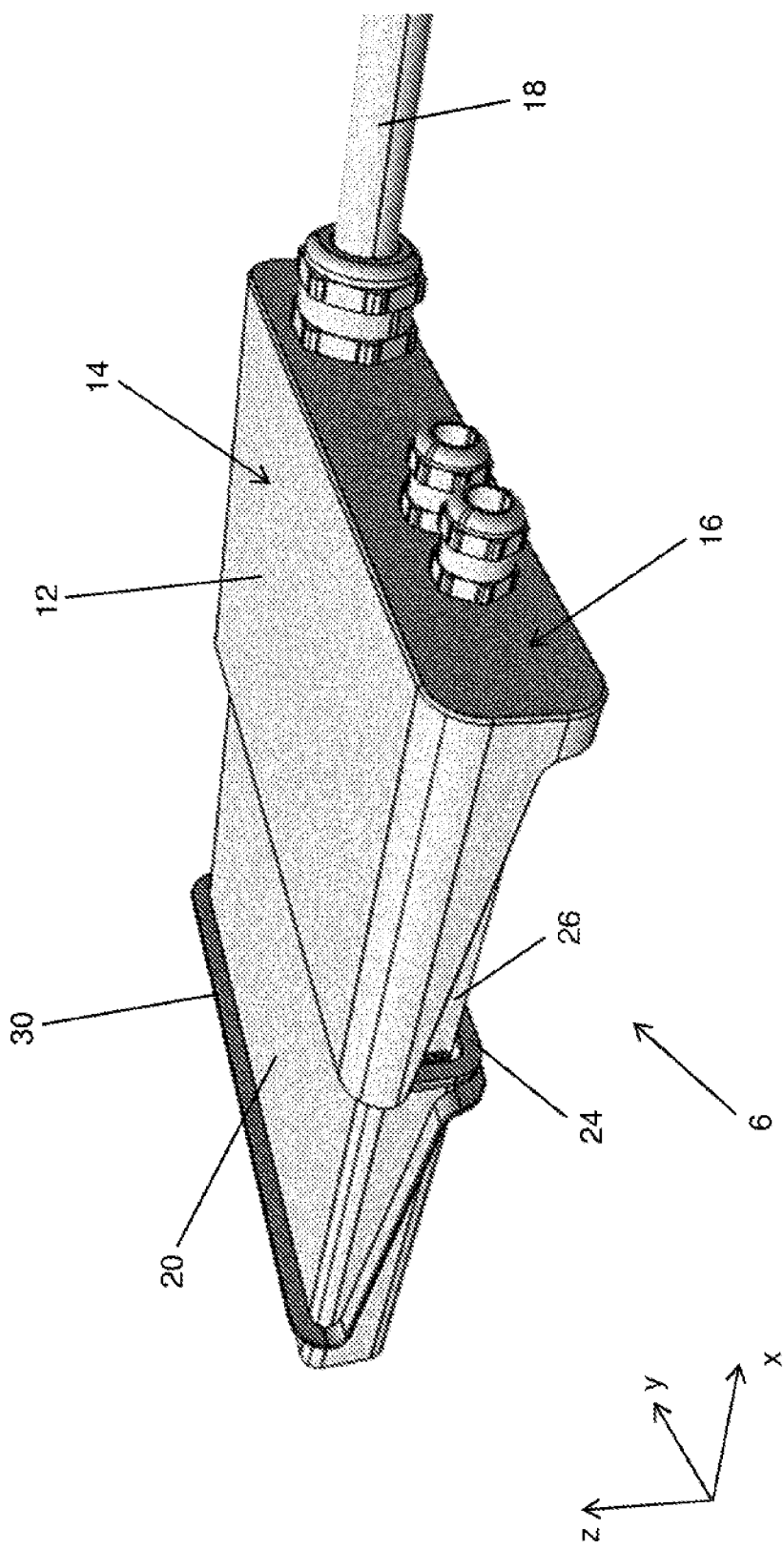
FIG. 3 is a further schematic perspective view of the contacting unit on a vehicle, as illustrated in FIG. 2.
Figure 4:
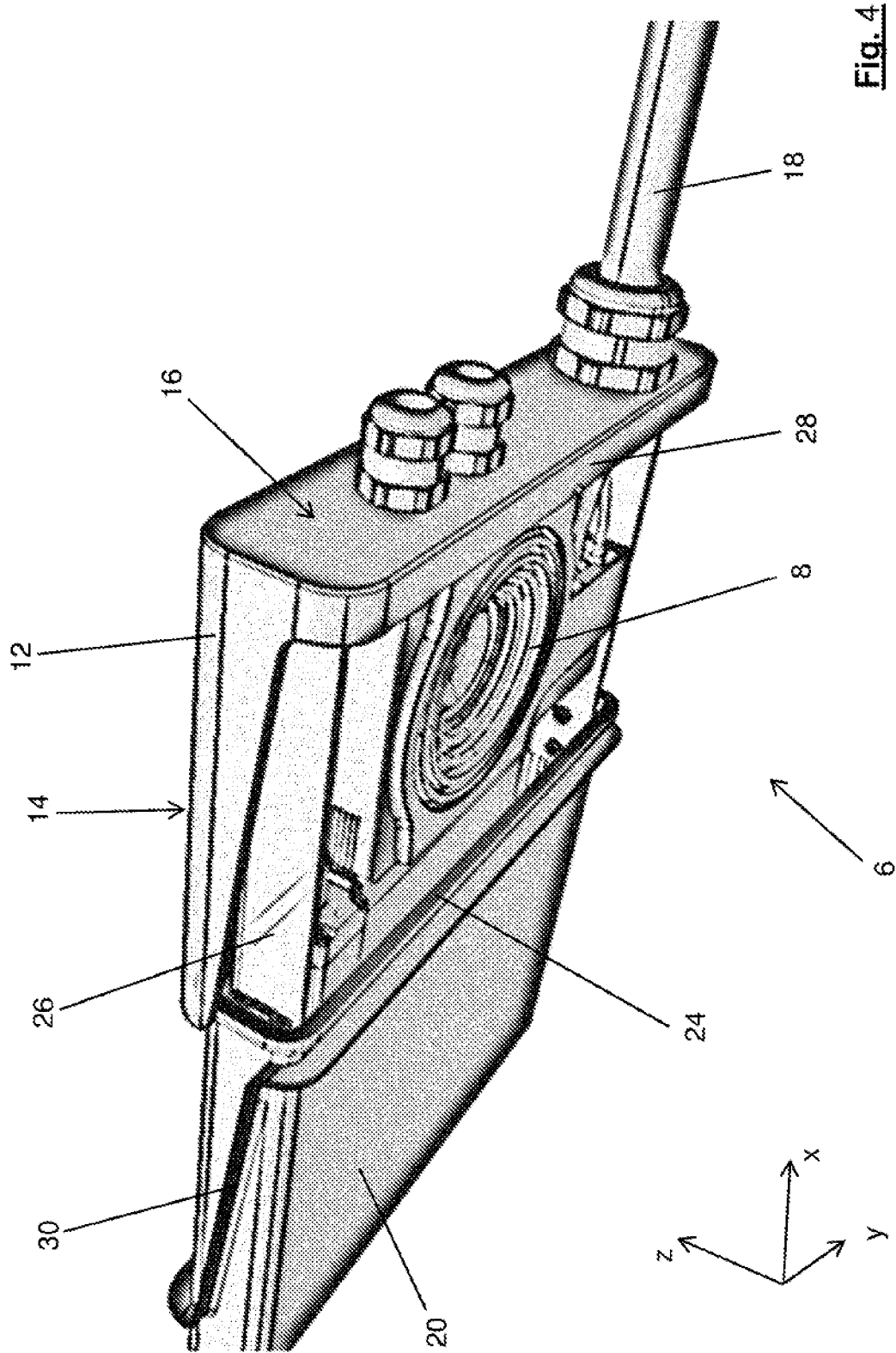
FIG. 4 is a third schematic perspective view of the contacting unit on a vehicle, as illustrated in FIG. 2.

To facilitate the automatic contacting, the electrical contacting unit 6 as shown in FIGS. 2 to 4 has ring-shaped electrical contacts 8 with different diameters which are arranged centrally one inside the other and which, in effect, form the counterpart shape for a cone. The counterpart 10 which fits with these ring-shaped electrical contacts 8 of the electrical contacting unit 6 is situated on the movable arm 4 of the charging robot 2 and has the corresponding conical shape. The major advantage of the conical shape consists in that, as the arm 4 of the charging robot 2 is pivoted up, the counterpart 10 self-centers in relation to electrical contacts 8 owing to the geometrical shape. Thus, for the contacting, it is not necessary for the charging robot 2 to arrive at the electrical contacts 8 with the counterpart 10 in a highly precise manner; it is sufficient if, as the arm 4 with the counterpart 10 is pivoted up, this arrives at at least the outermost ring of the electrical contacts 8. As the arm 4 is pivoted up further, the counterpart 10 can self-center in the electrical contacts 8 if, here, the charging robot 2 allows the required small degree of mobility in sideward, forward and backward directions.

FIGS. 2 to 4 show, from different viewing angles, the electrical contacting unit 6 which is attached to the underside of the electric or plug-in hybrid motor vehicle. The electrical contacting unit 6 has the above-described ring-shaped electrical contacts 8 with different diameters, which form a counterpart shape for a cone. Here, the cone widens downwardly in the vehicle vertical direction z, such that the charging robot 2 can make contact from below in the vehicle vertical direction z in an effective manner.

The electrical contacting unit 6 has a main support 12 by means of which the electrical contacting unit 6 is attached to the underside, facing toward the ground, of the motor vehicle. The main support 12 comprises, inter alia, a planar mounting plate 14, by means of which the electrical contacting unit 6 is attached to the motor vehicle, and a receiving plate 16 which, at an edge region of the mounting plate 14, protrudes approximately perpendicularly therefrom downwardly in the vehicle vertical direction z. In the central region of the receiving plate 16, the electrical contacts 8 are connected in a laterally protruding manner. From the electrical contacts 8, a cable 18 runs through the receiving plate 16 to the battery for charging.

For the automatic contacting of the charging cable with the electrical contacting unit 6 by means of the charging robot 2, the electrical contacts 8 must be freely accessible from below in the vehicle vertical direction z, as shown in FIGS. 2 to 4. By contrast, during travel, the electrical contacts 8 would become wet and dirty. Furthermore, they could be mechanically damaged for example as a result of a stone impact. The electrical contacts 8 must therefore be protected by means of a cover 20 during travel.

The cover 20 is composed of an elongate hollow body with a flat, rectangular cross section. Here, the edges are of rounded design. The front end side 22 of the cover as viewed in the vehicle longitudinal direction x is closed, whereas the rear end side is open. The rear end side has an outwardly protruding encircling collar, to which there is applied an encircling seal 24 which faces toward the receiving plate 16.

The cover 20 is displaceable in translational fashion in a vehicle longitudinal direction x between a charging position and a protective position. In the charging position shown in FIGS. 2 to 4, the cover 20 is situated in front of the electrical contacts 8 as viewed in the vehicle longitudinal direction x. In the protective position, the cover 20 has been moved rearward in the vehicle longitudinal direction x, such that the electrical contacts 8 are situated in the cavity of the cover 20. In the protective position of the cover 20, the seal 24 bears sealingly in encircling fashion against the receiving plate 16. Thus, in the protective position of the cover 20, the electrical contacts 8 are protected from all sides. At the front, and around the electrical contacts 8, the cover 20 itself provides the protection, whereas, at the rear as viewed in the vehicle longitudinal direction x, the covering plate 16 provides the required protection, which covering plate bears sealingly in encircling fashion against the rear end side or against the seal 24 on the rear end side of the cover 20. In this way, the electrical contacts 8 are, in the protective position, optimally protected against dirt and moisture.

In order to ensure controlled translational mobility of the cover 20, the main support 12 of the electrical contacting unit 6 has, on both sides, longitudinal guides 26 which guide the cover 20 in a defined manner in the vehicle longitudinal direction x. Additionally, the main support 12 has, around the covering plate 16, a web 28 which protrudes forward in the vehicle longitudinal direction x and which, in the protective position of the cover 20, protects the seal 24 against direct exposure to environmental influences, such that, for example, no dirty water can spray directly against the seal 24.

The cover 20 is moved, in a manner actuated by external power, by means of an electric drive with a spindle. Since the electrical contacting unit 6 is attached to the vehicle underside, it is not accessible, or is accessible only with extreme difficulty, to a vehicle user. Furthermore, it is the intention for the contacting of the charging cable to be performed automatically by means of the charging robot 2. It would therefore be counterproductive if the cover 20 first had to be moved manually from the protective position into the charging position. Therefore, the movement is performed by means of an electric drive, which converts its rotational movement into a longitudinal movement by means of a spindle.

The corresponding switching signal for the actuation of the electric drive may originate from a control unit which identifies that the battery of the motor vehicle is to be charged. This control unit may receive the signals required for this from the vehicle itself, which knows the present charging state of the battery, from the vehicle user and/or from the charging robot 2 which can make contact with the electrical contacting unit 6.

The cover 20 is fully exposed to all environmental influences in particular during travel. Owing to the arrangement on the vehicle underside, it is the case in particular that very significant quantities of spray water and dirt reach the outer side of the cover 20. It is important here that, when the vehicle is parked and during the movement of the cover 20 from the protective position into the charging position, no dirt and/or water can inadvertently pass from the outside of the cover 20 to the electrical contacts 8. Therefore, an outwardly protruding web 30 is attached in encircling fashion to the outer side of the cover 20, which web conducts in particular water away from the cover 20 in targeted fashion and thus prevents water and/or dirt from being able to reach the electrical contacts 8 during a movement of the cover 20. At the sides of the cover 20, said web 30 runs in a downwardly sloping manner at a shallow angle to the underside of the cover 20, where it runs in a vehicle transverse direction y close to the collar at the rear end side of the cover 20.

This embodiment according to the invention of an electrical contacting unit 6 makes possible a very flat design, which in particular takes up little structural space in a vehicle vertical direction z. Furthermore, it provides very reliable protection of the electrical contacts 8 in a straightforward manner.

What is claimed is:

1. A motor vehicle, comprising:
    an electrical contacting unit fixed to the vehicle for electrical contacting of an external charging cable,
    wherein the electrical contacting unit comprises:
        electrical contacts; and
        a movable cover, wherein
            the cover is movable, in a translational fashion, between a protective position, in which the cover covers the electrical contacts and protects the electrical contacts against dirt and/or water, and a charging position, in which the electrical contacts are accessible from surroundings of the vehicle,
            the cover is an elongate hollow body and, in the protective position, surrounds the electrical contacts in an encircling manner, whereas, in the charging position, the cover is situated adjacent to the electrical contacts, and
            the electrical contacting unit fixed to the vehicle is attached to an exterior on the vehicle underside, such that, in the charging position of the cover, the electrical contacts are contactable from below in a vehicle vertical direction.

2. The motor vehicle according to claim 1, wherein the cover is an elongate hollow body with a rectangular or trapezoidal cross section.

3. The motor vehicle according to claim 1, wherein the cover is movable between the charging position and the protective position in a manner driven by external power.

4. The motor vehicle according to claim 1, wherein the cover is movable in a horizontal plane of the vehicle.

5. The motor vehicle according to claim 1, wherein the electrical contacting unit fixed to the vehicle has a main support which is connected to the motor vehicle and to which the electrical contacts are attached.

6. The motor vehicle according to claim 1, wherein a seal is attached to the main support, and wherein the seal sealingly bears against the cover in the protective position.

7. The motor vehicle according to claim 5, wherein the main support has at least one longitudinal guide for the cover.

8. The motor vehicle according to claim 5, wherein a seal is attached in encircling fashion to the cover, and wherein the seal sealingly bears against the main support in the protective position.

9. The motor vehicle according to claim 8, wherein the seal is attached, in encircling fashion around an open end side, to the cover.

10. The motor vehicle according to claim 8, wherein the main support has a wall against which the seal bears in encircling fashion in the protective position of the cover.

11. The motor vehicle according to claim 1, wherein the cover has a closed end side.

12. The motor vehicle according to claim 11, wherein the cover has at least one protruding web, which conducts away spray water, situated on and/or at the cover.

* * * * *